United States Patent [19]

Haug et al.

[11] 4,135,414

[45] Jan. 23, 1979

[54] METHOD OF MAKING INSERTED BLADE HOB

[75] Inventors: Edward W. Haug; Charles E. Beck, both of Rockford, Ill.

[73] Assignee: Barber-Colman Company, Rockford, Ill.

[21] Appl. No.: 767,651

[22] Filed: Feb. 10, 1977

Related U.S. Application Data

[62] Division of Ser. No. 608,585, Aug. 28, 1975, Pat. No. 4,023,246.

[51] Int. Cl.² ............................................. B21K 21/00
[52] U.S. Cl. ................................................ 76/101 A
[58] Field of Search ........................... 76/101 A, 101 R

[56] References Cited

U.S. PATENT DOCUMENTS

| 2,325,746 | 8/1943 | Curtis | 29/105 R |
| 2,357,088 | 8/1944 | Curtis | 29/103 R |
| 2,361,995 | 11/1944 | Curtis | 29/103 R |
| 2,407,519 | 9/1946 | Salter | 29/105 R |
| 2,607,108 | 8/1952 | See | 29/105 R |

FOREIGN PATENT DOCUMENTS

| 1627092 | 4/1970 | Fed. Rep. of Germany | 29/103 B |
| 1109632 | 9/1955 | France | 29/103 B |
| 22518 | 10/1957 | German Democratic Rep. | 29/103 B |

OTHER PUBLICATIONS

Araldite – A New Adhesive Coating and Casting Resin – by C. J. Moss – British Plastics Magazine, 11/1948, pp. 521-526.

Primary Examiner—Al Lawrence Smith
Assistant Examiner—Roscoe V. Parker
Attorney, Agent, or Firm—A. Richard Koch

[57] ABSTRACT

High-speed tool steel cutting blades are inserted in slots in an inexpensive core and retained therein by a high-strength structural anaerobic adhesive. These adhesives are liquids before curing.

5 Claims, 2 Drawing Figures

METHOD OF MAKING INSERTED BLADE HOB

This is a division of application Ser. No. 608,585, filed Aug. 28, 1975, and now U.S. Pat. No. 4,023,246.

BACKGROUND OF THE INVENTION

This invention relates to hobs, milling cutters and the like tools. More particularly it relates to such tools with inserted cutting blades.

Inserted blade tools are well-known in the art. Inserted blades have been employed to enable replacement of cutting edges, to simplify grinding of cutting edges, to reduce the amount of expensive cutting material required, to provide a somewhat elastic support for brittle cutting material, and for other reasons. In the past tool steel inserts have had to be retained by mechanical means, such as screw, wedges, clamps, shrink fits and the like because high strength silver soldering, brazing and welding required temperatures in excess of the annealing temperature of the tool steels. The provision of screws, wedges, clamps and like extra components increases material costs, while the additional labor required for their application increases labor costs.

SUMMARY OF THE INVENTION

The hob, or similar tool, of the present invention is significantly less expensive to manufacture because the need for additional components, such as screws, wedges, clamps and the like, is eliminated along with the labor required to apply them. The high temperatures heretofore encountered when such additional components were not employed have become unnecessary. This invention makes possible the quick, easy and inexpensive production of inserted blade tools without the use of fixtures or high annealing or distorting temperatures. The inserted blades may be easily removed.

DESCRIPTION OF THE PREFERRED EMBODIMENTS

Figures 1, 2:
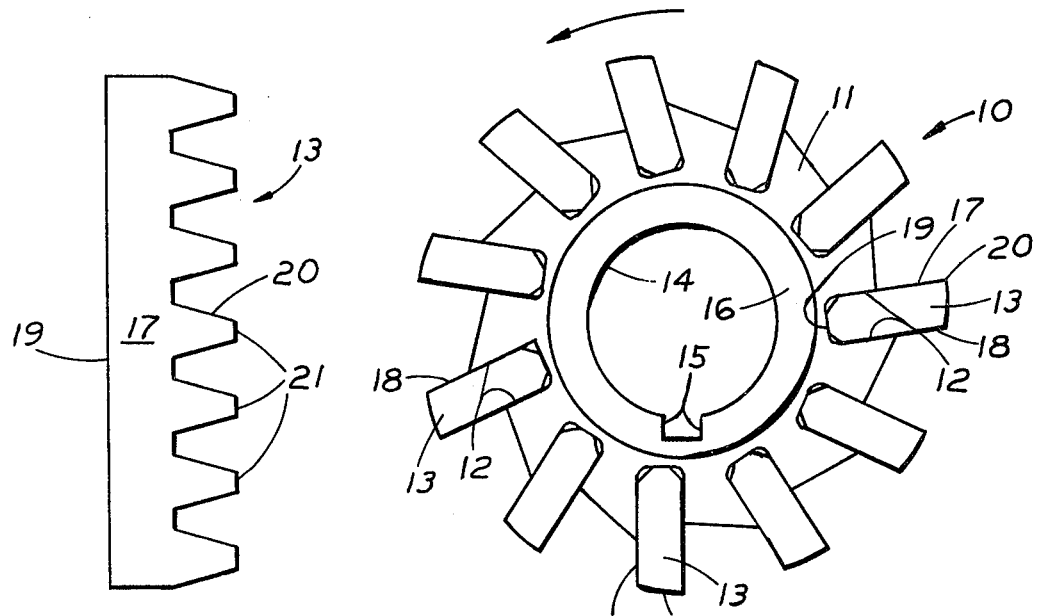
FIG. 1 is an end view of an inserted blade hob in accordance with this invention, illustrating several embodiments.
FIG. 2 is a profile view of a typical cutting blade as employed in FIG. 1.

Referring to FIG. 1, a hob 10 has a generally cylindrical core 11, on the outer periphery of which are a plurality of axially extending, spaced slots 12 receiving cutting blades 13. A circular bore 14 extends axially through the center of the hob to receive the arbor of a hobbing machine. A keyway 15 is provided to receive a key for drivingly engaging the hob to the arbor. A hub 16, extending beyond the core, surrounds the bore.

Each of the cutting blades 13 comprises parallel front and back surfaces 17, 18, respectively, and a bottom 19 to be snugly received in slots 12 preferably with less than 0.003 inch clearance at each side. The cutting blades are bonded to the core by a high-strength adhesive, the strength of the bond being dependent upon the clearance provided among other things. The cutting edge 20 is finish ground, or otherwise shaped, to the desired profile. As shown in FIG. 2, the profile comprises a plurality of teeth 21, as in a hob.

The cutting blades may be made of high speed tool steel such as the well-known M2, M3, M42, T1 and T15. The core may be made of a tough, easily machinable, relatively inexpensive material with stable dimensions and a thermal coefficient of expansion comparable to that of the cutting blades. A.I.S.I. 4140 alloy steel has been found satisfactory in combination with the high speed tool steels identified above. The bonding resin may be of a high shear strength, structural, single component, anaerobic, self-curing liquid resin such as polyester or acrylic. LOCTITE R/C 35 is an example of a polyester adhesive having a tensile shear strength of 4000 pounds per square inch with 0.003 inch maximum clearance between steel parts at the bond line. It will cure at room temperature, but a heat cure at 200°–300° F. provides greater strength in a much reduced time. An example of an acrylic adhesive is LOCTITE 317, having a tensile shear strength of 3500 pounds per square inch with 0.002 inch maximum clearance at the bond line when heat cured at 200°–300° F. These adhesives are liquids before curing. Curing at room temperature takes much longer and does not develop such high strength. This adhesive is characterized by high early strength and full resistance to all cutting or lubricating oils and solvents.

METHOD

The core 11 and hub 16 may be turned from solid steel or other suitable material. The slots 12 may be milled, the bore 14 bored, and the keyway 15 broached. Alternatively the core 11 with slots 12, bore 14 and hub 16 (if any) could be at least rough formed by casting, forging, extruding, or pressing and sintering from powdered metal, after which it can be finished, if necessary, as if made from a solid material. The core 11 with slots 12, bore 14 and keyway 15 could be assembled from stacks of aligned laminations 45 fastened together as by rivets, welding, brazing, soldering, adhesive bonding, or the like. The method by which the core 11 is made is not involved in this invention. It is only necessary that the finished part be capable of use as a core and that the slots have substantially parallel sides and a width providing satisfactory clearance for the blades to be inserted therein. The clearance should preferably be no more than 0.003 inch on a side. More clearance will reduce the strength of the bond between the blades and the core and permit less accurate positioning of the cutting blades 13 in the slots.

The cutting blades 13 are formed with parallel front and back surfaces 18, 19 as by cutting from plates. The surfaces should be flat and clean. The rough or final contour of the cutting edge 20 may or may not be present before the blades are inserted into the slots 12. The method of formation is of no concern.

The high shear strength adhesive is applied as a liquid to both sides of the slots 12 and to the front and back surfaces 18, 19 where they will be forming an interface with the sides of the slots. The blades are then inserted in the slots. If the adhesive has high early strength, as does LOCTITE 317, no further means for retaining the blades in the slots prior to curing is required. If the adhesive, such as LOCTITE R/C 35, is not of the high early strength type, a drop or so of a quick-set, or pressure sensitive adhesive, such as the cyano-acrylate resin type sold as SUPERBONDER 03 or 06 or EASTMAN 910, in the bottom of the slots or on the bottom 19 of the blades and pressing the blades against the bottom of the slots will retain the blades in the slots prior to curing. The quick-set adhesive is not relied upon to retain the blades in the slots after curing of the high shear strength adhesive. Fixtures are not required when such procedure is followed. The high-strength adhesives mentioned will cure at room temperature in several days, but will not develop the highest tensile shear strength. Curing at 300° F. is accomplished in 5 minutes, and at 200° F. in an hour.

After curing the adhesive, the cutting edge 20 may be finish ground to the desired contour. The hob, or similar tool, is now ready for use.

If it should be desirable to remove the inserted blades from the slots, it can easily be accomplished by heating and assembly to destroy the bond. This is accomplished at 700° F. with the adhesives mentioned.

The temperatures involved are well below those that may distort or anneal a tool steel cutting blade or a steel core.

The described embodiments are exemplary only. The scope of the invention is defined by the claims.

We claim:

1. A method for producing an inserted blade tool comprising the steps of forming a cylindrical core with an axial peripheral slot having a width to snugly receive a cutting blade, applying a liquid high shear strength adhesive to a surface to form an interface between the slot and the cutting blade, inserting the cutting blade in said slot to establish the interface, retaining the cutting blade in said slot prior to curing, and curing the adhesive to form a bond between the core and the cutting blade.

2. A method according to claim 1 wherein said interface comprises the sides of said slot and portions of the front and back surfaces of said cutting blade.

3. A method according to claim 1 wherein said retaining comprises applying a quick-set second adhesive to the interface to be formed at the bottom of said slot, and pressing the cutting blade against said bottom.

4. A method according to claim 1 wherein curing comprises heating the adhesive to a predetermined curing temperature.

5. A method acording to claim 4 wherein said curing temperature is lower than substantially 300° F.

* * * * *